Aug. 21, 1923.
T. J. YOUNT
1,465,923
STEAK AND CHOP CUTTER
Filed April 17, 1922
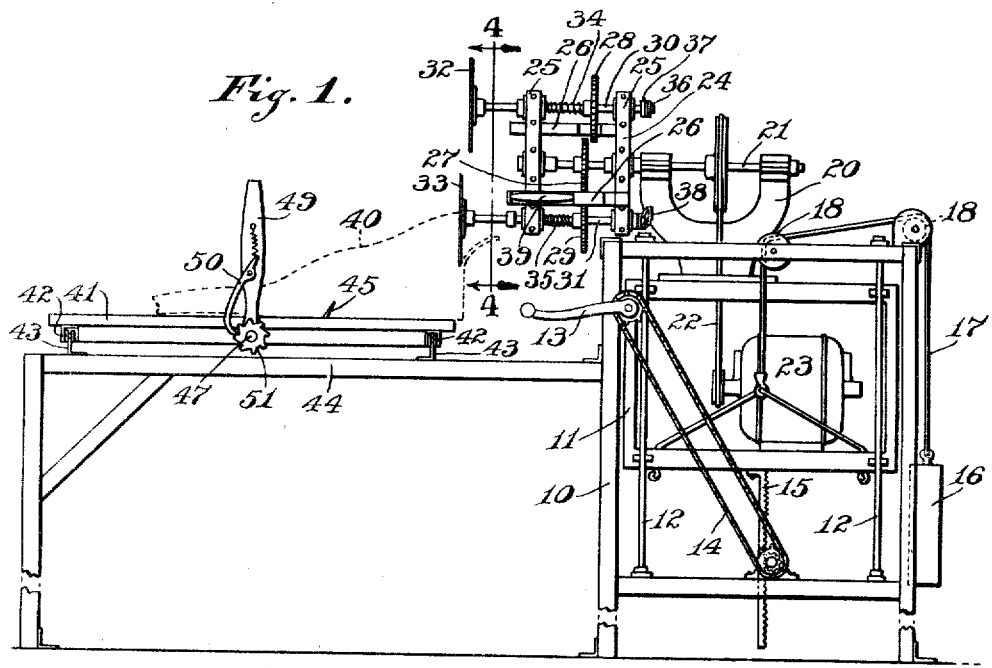
Fig. 1.
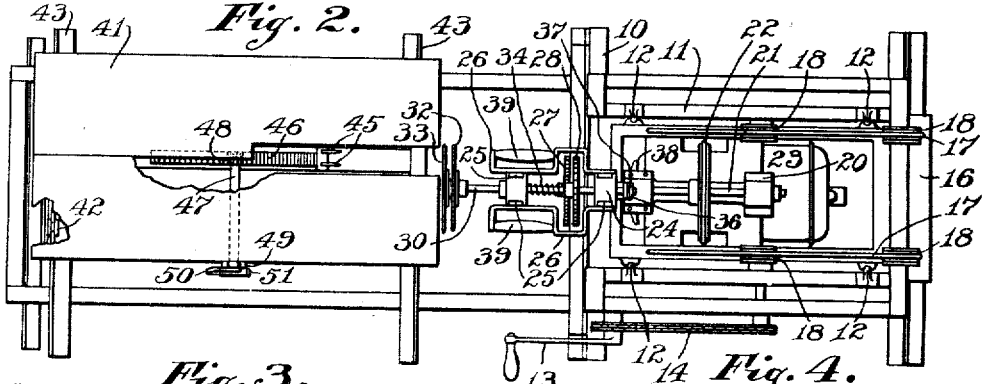
Fig. 2.
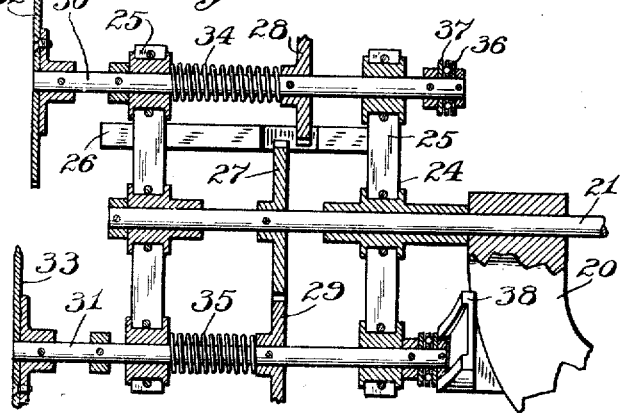
Fig. 3.
Fig. 4.
INVENTOR
Thomas J. Yount,
BY
G. Schley
ATTORNEY Patented Aug. 21, 1923.

1,465,923

UNITED STATES PATENT OFFICE.

THOMAS J. YOUNT, OF INDIANAPOLIS, INDIANA, ASSIGNOR TO FRANK H. YOUNT, OF INDIANAPOLIS, INDIANA.

STEAK AND CHOP CUTTER.

Application filed April 17, 1922. Serial No. 553,542.

*To all whom it may concern:*

Be it known that I, THOMAS J. YOUNT, a citizen of the United States, residing at Indianapolis, in the county of Marion and State of Indiana, have invented a new and useful Steak and Chop Cutter, of which the following is a specification.

It is the object of my present invention to provide a simple and efficient machine for both cutting meat and sawing through the bones encountered in meat, as in cutting steaks and chops, to save the butcher the necessity for using his hand knife and hand saw; and to do this by a machine which is simple and effective, and sufficiently inexpensive to warrant the butcher in using it.

The accompanying drawing illustrates my invention: Fig. 1 is a front elevation of a meat saw and cutter embodying my invention; Fig. 2 is a plan of such machine; Fig. 3 is an enlarged fragmental section showing the supporting and clutching mechanism for the rotating saw and the rotating cutter; and Fig. 4 is a section on the line 4—4 of Fig. 1.

The main frame 10, designed to rest on the floor, carries a vertically adjustable subframe 11, vertically movable on vertical slide rods 12 by a suitable crank 13 connected by a chain 14 and suitable sprockets to drive a pinion operating a rack 15 on the sub-frame 11. The sub-frame is provided with a suitable counter-weight 16, connected to the sub-frame by a cord 17 passing over suitable pulleys 18 provided on the frame 10.

The sub-frame 11 is provided with a shaft-supporting yoke 20 in which is mounted a horizontal shaft 21; which is driven, through a belt 22 and suitable pulleys, by an electric motor 23 also carried by the sub-frame 11. The shaft 21 has a rotatable frame 24 mounted on its projecting end, the left end in Fig. 1, which frame consists of two bars 25 transverse to the shaft 21 and two cross bars 26 interconnecting the two bars 25. Between the two bars 25, the shaft 21 carries a driving gear 27, which may mesh with either of two gears 28 and 29. The gears 28 and 29 are mounted on two shafts 30 and 31 respectively, mounted in the oppositely projecting ends of the bars 25 of the frame 24. When either gear 28 or 29 is in mesh with the driving gear 27, the shaft 30 or 31 carrying such gear 28 or 29 is rotated by the operation of the motor 23. The shaft 30 carries a disk saw 32, with proper teeth for cutting bones; and the shaft 31 carries a disk knife or cutter 33, for cutting meat.

The frame 24 may be swung around the shaft 21 as desired, to bring either the shaft 30 or the shaft 31 below the level of the shaft 21. Only the shaft 30 or 31 which is below the shaft 21 is in operative position for cutting, and hence it need not be driven when it is above the shaft 21. This also makes for safety, to avoid accidents to the operator. I preferably throw these shafts 30 and 31 automatically into and out of operation by the rotation of the frame 24, so that each of such shafts is operative when it is below and inoperative when it is above the shaft 21. This may be done in various ways. In the preferred arrangement illustrated, I do this by making the shafts 30 and 31 axially slidable in the frame 24, and provide compression springs 34 and 35 which surround said two shafts respectively between the gears carried thereby and the left-hand bar 25 so that the action of such springs tends to move the associated shafts and their carried gears toward the right, to disengage such gears 28 and 29 respectively from the driving gear 27. Such disengagement exists for the upper of the two shafts and gears, as shown in Figs. 1 and 3, so that the saw or cutter carried by such upper shaft will not then rotate. On the right-hand end (Figs. 1 and 3) of each shaft 30 I provide a thrust washer 36, which acts through a thrust bearing 37 on the shaft 30. On the yoke 20 I provide an arc-shaped cam 38, with which either thrust washer 36 co-operates when it is swung below the shaft 21, so that by the action of the cam 38 such thrust washer is forced to the left (Figs. 1 and 3) and acts through the thrust bearing 37 to force its associated shaft 30 or 31 to the left and its associated gear 28 or 29 into mesh with the driving gear 27. This makes operative such shaft 30 or 31 which is below the shaft 21, so that the saw or cutter carried thereby will be rotated.

The cam 38 is of considerable circumferential extent, so that the frame 24 may be oscillated through a considerable arc without demeshing the lower gear 28 or 29 from the driving gear 27. Such oscillation may be obtained by one of the handles 39, which are located in convenient position for the operator to grasp. There is one of these handles 39 on each of the two cross bars 26; and each cross bar is so located and bent, as is clear from Figs. 1 and 2, that it largely guards the hand of the operator from getting caught in the gears 27, 28, and 29.

By turning the frame 24 to bring the proper shaft 30 or 31 lowermost, such shaft is clutched to the shaft 21 by the intermeshing of the gears 28 or 29 with the driving gear 27, and either the saw 32 or the cutter 33 may be brought into cooperation with a piece of meat 40 mounted on the table 41. By oscillating the frame 24 by one of the handles 39, the cutter or saw may be swung across the face of such meat, to cut off a slice of the desired thickness. As the cutting continues, the sub-frame 11 may be gradually lowered, by manipulating the crank 13. In this way, the butcher may conveniently use either a saw or a cutter as occasion requires, according as meat or bone is encountered.

The table 41 is a sliding table, mounted by rollers 42 on rails 43 carried by a slide frame 44. The rails 43 extend transversely of the shaft 21, so that as the table 41 is slid along the rails the meat passes beneath the saw or cutter by a movement parallel to the plane of such saw or cutter. The combination of this movement of the table 41 with the oscillating movement which may be given the frame 24 makes it possible for the butcher to saw or cut much as he would with a hand-saw and a hand-knife, but with greater rapidity and much less labor.

The meat 40 may be held on the table 41, and fed along such table parallel with the shaft 21, in any desired manner.

In my preferred arrangement, I provide upwardly projecting prongs 45 on the right-hand end of a horizontally sliding rack 46 slidable along the table 41 parallel to the shaft 21. Such prongs 45 project upward through a slot in the table 41, so that the meat 40 may be set on to said prongs and moved therewith as the prongs are moved. To move the prongs and the meat, a feeding shaft 47 is provided, having at its inner end a pinion 48 meshing with the rack 46, and provided at its outer end with a loosely mounted operating arm 49 connectible to the shaft 47 by a pawl 50 co-operating with a ratchet wheel 51. By swinging the arm 49 in a counter-clockwise direction (Fig. 1) the rack 46 and prongs 45 are fed to the right (Figs. 1 and 2) to feed the meat 40 forward into position for sawing and cutting. This makes it possible to get an accurate adjustment of the meat with regard to the saw and the cutter. When it is desired to move the meat 40 to the left, this may be done by merely shoving it by hand; as the ratchet-mechanism 51 permits this without operation of the arm 49.

I claim as my invention:

1. A combined meat saw and cutter, comprising a main supporting frame, a sub-frame vertically adjustable therein, a driving shaft in said sub-frame, a rotatable frame carried by and overhanging beyond said sub-frame, and a plurality of shafts carried by said rotatable frame and provided respectively with disk-shaped butchering members so that any of such shafts may be brought into a lower operative position, said shafts being drivable from said driving shaft.

2. A combined meat saw and cutter, comprising a main supporting frame, a sub-frame vertically adjustable therein, a driving shaft in said sub-frame, a rotatable frame carried by said sub-frame, and a plurality of shafts carried by said rotatable frame and provided respectively with disk-shaped butchering members so that any of such shafts may be brought into a lower operative position, said shafts being drivable from said driving shaft and being provided with declutchable driving connections to said driving shaft.

3. A combined meat saw and cutter, comprising a main supporting frame, a sub-frame vertically adjustable therein, a driving shaft in said sub-frame, a rotatable frame carried by said sub-frame, and a plurality of shafts carried by said rotatable frame and provided respectively with disk-shaped butchering members so that any of such shafts may be brought into a lower operative position, and means for connecting any of said shafts in said rotatable frame to said driving shaft by movements of said rotatable frame to predetermined positions.

4. A combined meat saw and cutter, comprising a main supporting frame, a sub-frame vertically adjustable therein, a driving shaft in said sub-frame, a rotatable frame carried by said sub-frame, a plurality of shafts carried by said rotatable frame and provided respectively with disk-shaped butchering members so that any of such shafts may be brought into a lower operative position, a declutchable driving connection between said driving shaft and each of the shafts in said rotatable frame, and means for controlling said connections by the movement of said rotatable frame.

5. A combined meat saw and cutter, comprising a main supporting frame, a sub-frame vertically adjustable therein, a rotatable frame carried by and overhanging beyond said sub-frame, a plurality of shafts carried by said rotatable frame and provided respectively with disk-shaped butchering members so that any of such shafts may be brought into a lower operative position, and a slidable meat-supporting table slidable in a direction parallel to the plane of said butchering devices.

6. A combined meat saw and cutter, comprising a main supporting frame, a sub-frame vertically adjustable therein, a rotatable frame carried by and overhanging beyond said sub-frame, a plurality of shafts carried by said rotatable frame and provided respectively with disk-shaped butchering members so that any of such shafts may be brought into a lower operative position, a slidable meat-supporting table slidable in a direction parallel to the plane of said butchering devices, means on said table for holding a piece of meat against sliding, and means for feeding said holding means transversely to the plane of movement of said butchering devices.

7. A combined meat saw and cutter, comprising a main frame, a counterweighted sub-frame vertically slidable therein, a driving shaft carried by and overhanging beyond said sub-frame, a rotatable frame carried by said sub-frame and rotatable about the axis of said driving shaft, two shafts carried eccentrically by said rotatable frame and provided with a disk saw and a disk cutter respectively, whereby by the rotation of said rotatable frame either said disk saw or said disk cutter may be brought to the lower position.

8. A combined meat saw and cutter, comprising a main frame, a counterweighted sub-frame vertically slidable therein, a driving shaft carried by said sub-frame, a rotatable frame carried by said sub-frame and rotatable about the axis of said driving shaft, two shafts carried eccentrically by said rotatable frame and provided with a disk saw and a disk cutter respectively, whereby by the rotation of said rotatable frame either said disk saw or said disk cutter may be brought to the lower position, and means operable by the bringing of said disk saw or disk cutter to its lower position for operatively connecting its shaft to be driven by said driving shaft.

9. A combined meat saw and cutter, comprising a main supporting frame, a sub-frame vertically adjustable therein, a rotatable frame carried by and overhanging beyond said sub-frame, and a plurality of shafts carried by said rotatable frame and provided respectively with disk-shaped butchering members so that any of such shafts may be brought into a lower operative position.

10. A combined meat saw and cutter, comprising a main supporting frame, a sub-frame vertically adjustable therein, a rotatable frame carried by and overhanging beyond said sub-frame, a plurality of shafts carried by said rotatable frame and provided respectively with disk-shaped butchering members so that any of such shafts may be brought into a lower operative position, a meat-supporting table, means on said table for holding a piece of meat against sliding, and means for feeding said holding means transversely to the plane of movement of said butchering devices.

11. A combined meat saw and cutter, comprising a main supporting frame, a sub-frame vertically adjustable therein, a driving shaft in said sub-frame, a rotatable frame carried by said driving shaft and rotatable thereon, and a plurality of shafts carried by said rotatable frame and provided respectively with disk-shaped butchering members so that any of such shafts may be brought into a lower operative position, said shafts being drivable from said driving shaft.

12. A combined meat saw and cutter, comprising a main supporting frame, a sub-frame vertically adjustable therein, a driving shaft mounted in said sub-frame and having one end projecting beyond said sub-frame, a rotatable frame rotatably mounted on the projecting end of said driving shaft, and a plurality of shafts carried by said rotatable frame and provided respectively with disk-shaped butchering members so that any of such shafts may be brought into a lower operative position, said shafts being drivable from said driving shaft.

In witness whereof, I have hereunto set my hand at Indianapolis, Indiana, this 13th day of April, A. D. one thousand nine hundred and twenty-two.

THOMAS J. YOUNT.